(12) United States Patent
Angelopoulos

(10) Patent No.: US 6,341,871 B1
(45) Date of Patent: Jan. 29, 2002

(54) LIGHT MECHANISM FOR A CELL PHONE

(76) Inventor: Jim A. Angelopoulos, 6650 Drexel Ave., Los Angeles, CA (US) 90048

( * ) Notice: Subject to any disclaimer, the term of this patent is extended or adjusted under 35 U.S.C. 154(b) by 0 days.

(21) Appl. No.: 09/506,557

(22) Filed: Feb. 18, 2000

(51) Int. Cl.⁷ .................................................. G01D 11/28
(52) U.S. Cl. ............................ 362/23; 362/24; 362/88; 362/226; 362/109; 362/253; 379/433
(58) Field of Search ........................... 362/23, 24, 88, 362/226, 253, 285, 109, 116; 379/433, 457, 428; 455/90, 575, 572

(56) References Cited

U.S. PATENT DOCUMENTS

| | | |
|---|---|---|
| 2,777,940 A | 1/1957 | Spiro et al. |
| 2,937,263 A | 5/1960 | Lehberger |
| 3,821,539 A | 6/1974 | Kleinman |
| 4,618,917 A | 10/1986 | Lee et al. |
| D325,029 S | 3/1992 | Nagele et al. |
| 5,237,607 A | * 8/1993 | Diamantis .................... 379/419 |
| 5,303,291 A | * 4/1994 | Takagi et al. ................ 379/433 |
| 5,408,060 A | 4/1995 | Muurinen |

* cited by examiner

Primary Examiner—Sandra O'Shea
Assistant Examiner—Bertrand Zeade

(57) ABSTRACT

A light mechanism for a cell phone for providing a useful light when needed by a cell phone user. The light mechanism for a cell phone includes a light-producing member having a plug member, a bulb support member pivotally attached to an end of the plug member, a bulb member securely mounted to the bulb support member, and a switch member securely attached to the bulb support member for turning on/off the bulb member. As a second embodiment, the inventive device includes a light-producing member having a bulb member adapted to extend out of and retract in a bottom end of a cell phone, and also includes a switch for turning on/off the bulb member and also for extending the bulb member through the bottom end and for sliding a door member to allow the bulb member to extend out of the bottom end of the cell phone.

11 Claims, 2 Drawing Sheets

FIG. 1

LIGHT MECHANISM FOR A CELL PHONE

BACKGROUND OF THE INVENTION

1. Field of the Invention

The present invention relates to a cell phone light and more particularly pertains to a new light mechanism for a cell phone for providing a useful light when needed by a cell phone user.

2. Description of the Prior Art

The use of cell phone light is known in the prior art. More specifically, cell phone light heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,618,917; U.S. Pat. No. 2,937,263; U.S. Pat. No. 2,777,940; U.S. Pat. No. 3,821,539; U.S. Pat. No. 5,408,060; and U.S. Pat. No. Des. 325,029.

While these devices fulfill their respective, particular objectives and requirements, the aforementioned patents do not disclose a new light mechanism for a cell phone. The inventive device includes a light-producing member having a plug member, a bulb support member pivotally attached to an end of the plug member, a bulb member securely mounted to the bulb support member, and a switch member securely attached to the bulb support member for turning on/off the bulb member. As a second embodiment, the inventive device includes a light-producing member having a bulb member adapted to extend out of and retract in a bottom end of a cell phone, and also includes a switch for turning on/off the bulb member and also for extending the bulb member through the bottom end and for sliding a door member to allow the bulb member to extend out of the bottom end of the cell phone.

In these respects, the light mechanism for a cell phone according to the present invention substantially departs from the conventional concepts and designs of the prior art, and in so doing provides an apparatus primarily developed for the purpose of providing a useful light when needed by a cell phone user.

SUMMARY OF THE INVENTION

In view of the foregoing disadvantages inherent in the known types of cell phone light now present in the prior art, the present invention provides a new light mechanism for a cell phone construction wherein the same can be utilized for providing a useful light when needed by a cell phone user.

The general purpose of the present invention, which will be described subsequently in greater detail, is to provide a new light mechanism for a cell phone which has many of the advantages of the cell phone light mentioned heretofore and many novel features that result in a new light mechanism for a cell phone which is not anticipated, rendered obvious, suggested, or even implied by any of the prior art cell phone light, either alone or in any combination thereof.

To attain this, the present invention generally comprises a light-producing member having a plug member, a bulb support member pivotally attached to an end of the plug member, a bulb member securely mounted to the bulb support member, and a switch member securely attached to the bulb support member for turning on/off the bulb member. As a second embodiment, the inventive device includes a light-producing member having a bulb member adapted to extend out of and retract in a bottom end of a cell phone, and also includes a switch for turning on/off the bulb member and also for extending the bulb member through the bottom end and for sliding a door member to allow the bulb member to extend out of the bottom end of the cell phone.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new light mechanism for a cell phone which has many of the advantages of the cell phone light mentioned heretofore and many novel features that result in a new light mechanism for a cell phone which is not anticipated, rendered obvious, suggested, or even implied by any of the prior art cell phone light, either alone or in any combination thereof.

It is another object of the present invention to provide a new light mechanism for a cell phone which may be easily and efficiently manufactured and marketed.

It is a further object of the present invention to provide a new light mechanism for a cell phone which is of a durable and reliable construction.

An even further object of the present invention is to provide a new light mechanism for a cell phone which is susceptible of a low cost of manufacture with regard to both materials and labor, and which accordingly is then susceptible of low prices of sale to the consuming public, thereby making such light mechanism for a cell phone economically available to the buying public.

Still yet another object of the present invention is to provide a new light mechanism for a cell phone which provides in the apparatuses and methods of the prior art some of the advantages thereof, while simultaneously overcoming some of the disadvantages normally associated therewith.

Still another object of the present invention is to provide a new light mechanism for a cell phone for providing a useful light when needed by a cell phone user.

Yet another object of the present invention is to provide a new light mechanism for a cell phone which includes a light-producing member having a plug member, a bulb support member pivotally attached to an end of the plug member, a bulb member securely mounted to the bulb support member, and a switch member securely attached to the bulb support member for turning on/off the bulb member. As a second embodiment, the inventive device includes a light-producing member having a bulb member adapted to extend out of and retract in a bottom end of a cell phone, and also includes a switch for turning on/off the bulb member and also for extending the bulb member through the bottom end and for sliding a door member to allow the bulb member to extend out of the bottom end of the cell phone.

Still yet another object of the present invention is to provide a new light mechanism for a cell phone that can be easily and quickly plugged into the battery jack of a cell phone.

Even still another object of the present invention is to provide a new light mechanism for a cell phone that eliminates the need for the user to use a separate flash light when using the cell phone during the dark These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
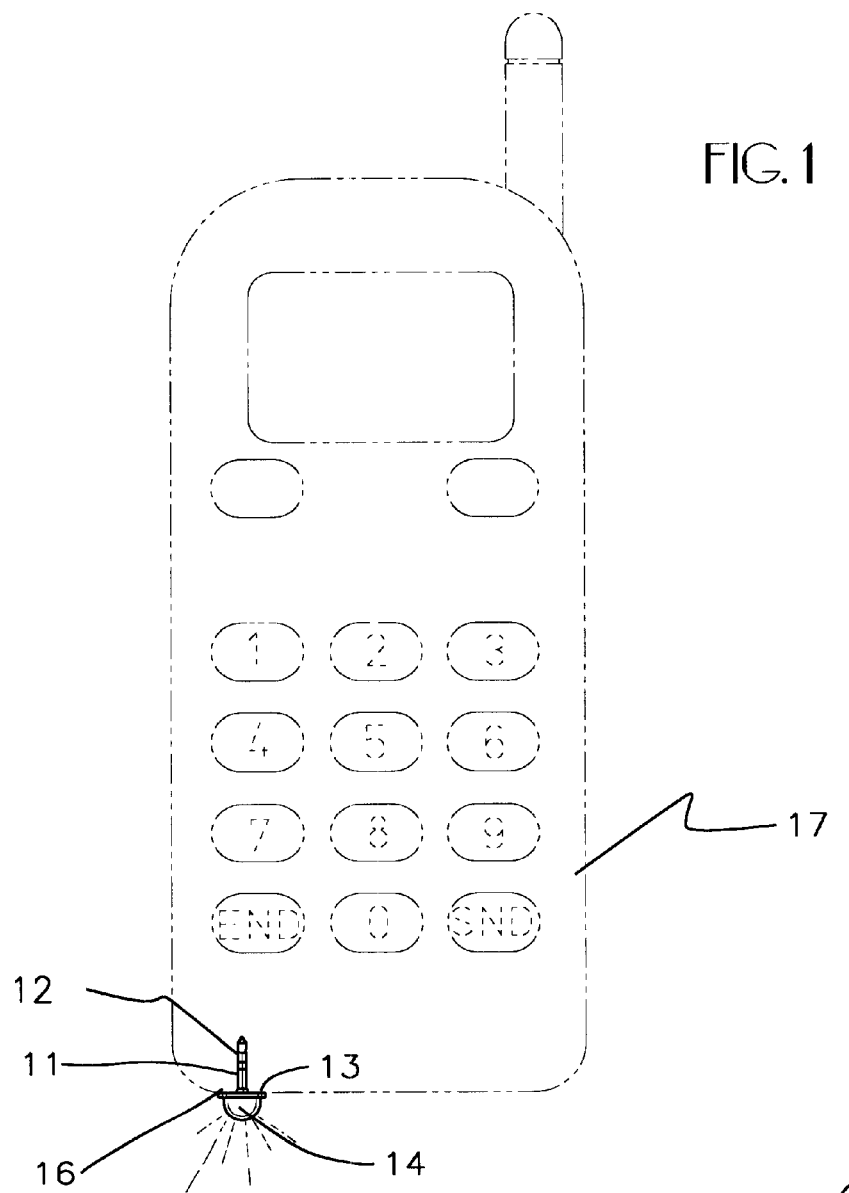
FIG. 1 is a side elevational view of a new light mechanism for a cell phone according to the present invention and being used.
Figure 2:
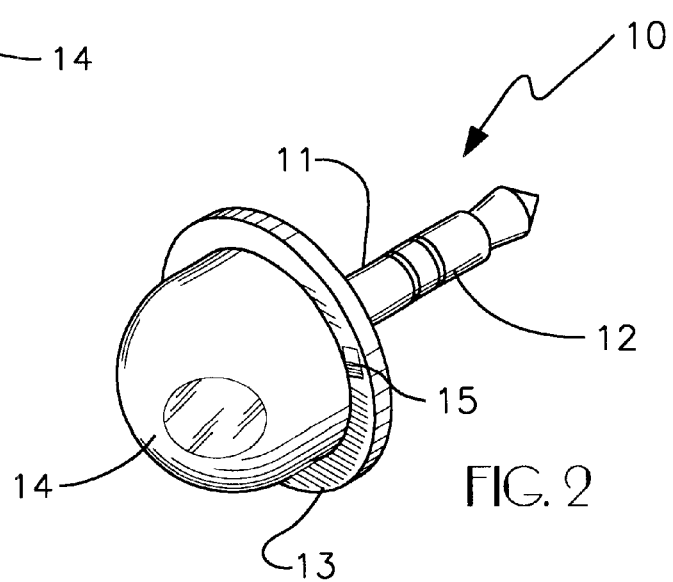
FIG. 2 is a perpsective view of the present invention.
Figure 3:
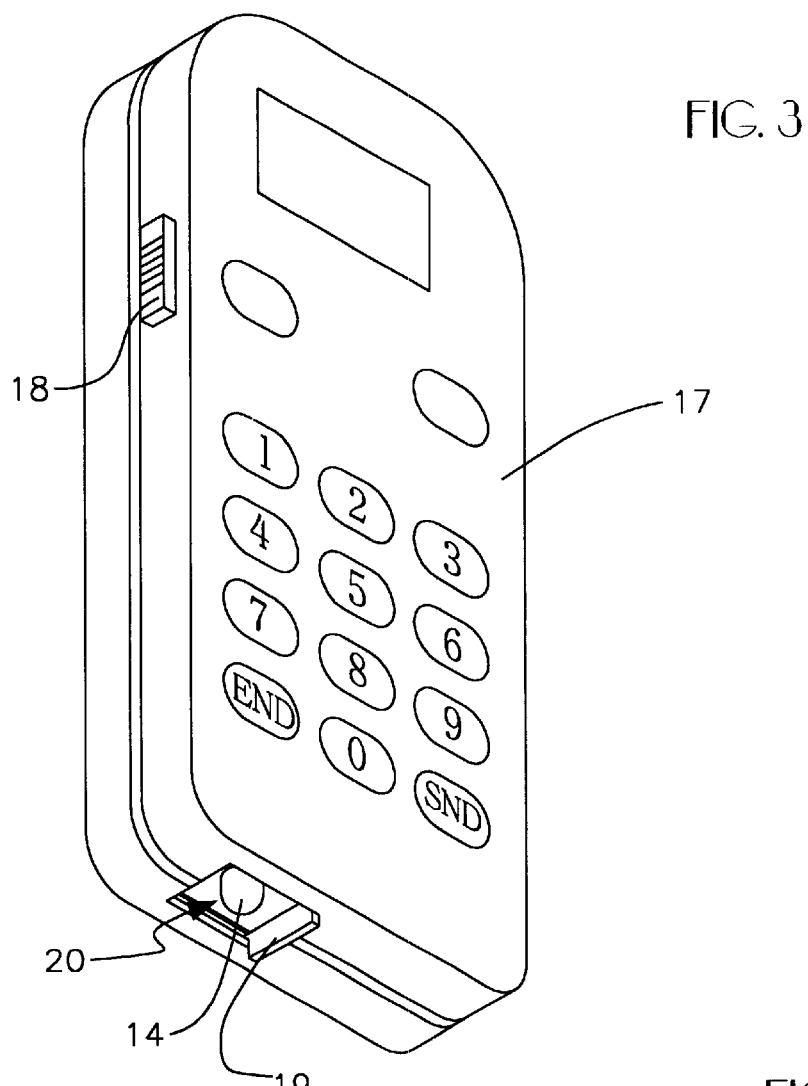
FIG. 3 is a side elevational view of a second embodiment of the present invention.
Figure 4:
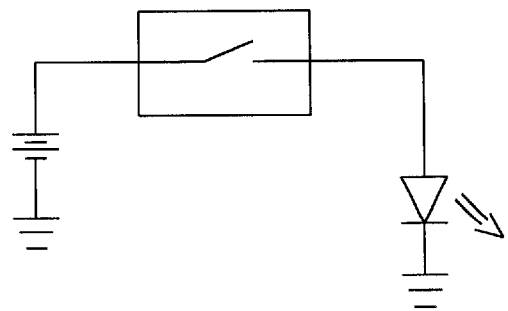
FIG. 4 is a schematic diagram of the present invention.

With reference now to the drawings, and in particular to FIGS. 1 through 4 thereof, a new light mechanism for a cell phone embodying the principles and concepts of the present invention and generally designated by the reference numeral 10 will be described.

As best illustrated in FIGS. 1 through 4, the light mechanism for a cell phone 10 generally comprises a light-producing member 11 adapted to be connected to a cell phone 17. As a first embodiment, the light-producing member 11 includes a plug member 12 adapted to plug into a battery jack 16 of a cell phone 17, and also includes a bulb support member 13 pivotally and conventionally attached to an end of the plug member 12, and further includes a bulb member 14 securely and conventionally mounted to the bulb support member 13. The bulb support member 13 is adapted to pivot at an angle to the plug member 12 so that a user can manipulate the bulb member 14 as desired. A means for turning on/off the light-producing member 11 includes a switch member 15 securely and conventionally mounted to the bulb support member 13 and connected to the bulb member 14.

As a second embodiment, the light-producing member 11 includes a bulb member 14 which is adapted to be disposed in a cell phone 17 through an opening 20 in a bottom end thereof with the bulb member 14 being adapted to extend out of and retract in the opening 20 which is opened and closed with a sliding door member 19. A means for turning on/off the light-producing member 11 includes a switch 18 adapted to be-mounted upon a wall of the cell phone 17 with the switch being connected to the bulb member 14 to energize the extending and retracting of the bulb member 14 relative to the cell phone 17 and being adapted to be connected to the door member 19 for energizing the opening and closing thereof.

In use, the user can either insert the light-producing member 11 in the battery jack 16 and angle the bulb member 14 as desired by the user, or turn on the switch 18 mounted on a cell phone 17 having the light-producing member 11 disposed in through the bottom end of the cell phone 17 which causes the sliding door member 19 to open and the bulb member 14 to extend out of the bottom end of the cell phone 17.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An illumination system for removably mounting on a cell phone having a battery jack with a conductive cavity extending into the cell phone, said system comprising:

an illumination assembly for removably mounting on the battery jack of the cell phone, said illumination assembly comprising:

a plug portion removably mountable in the conductive cavity of the cell phone, said plug portion having conductive surfaces for electrically communicating with the conductive cavity of the battery jack, said plug portion having an insertion end for inserting into the conductive cavity and a base end opposite said insertion end;

a light support portion mounted on the base end of said plug portion;

a light portion mounted on the light support portion; and a switching means for selectively switching on and off supply of electrical power from said plug portion to said light portion.

2. An illumination system as described in claim 1, wherein said bulb support member is pivotally attached to said plug member.

3. An illumination system as described in claim 1, wherein said switching means includes a switch member mounted to said bulb support member and connected to said bulb member.

4. An illumination system as described in claim 2, wherein said bulb support member pivots about a central longitudinal axis of said plug portion, and wherein said light portion has a domed case with a substantially transparent lens mounted thereon for passing light therethrough, said lens being located at a distance from said central longitudinal axis such that light passing through said lens is directable in different directions.

5. A cell phone with an illumination assembly, comprising:
    a cell phone with a housing having a front and a back and a perimeter wall extending between the front and back, a key pad being mounted on the front of said housing, a recess being formed in said housing and being in communication with an opening in said perimeter wall;
    an illumination assembly mounted in said recess of said housing for shining light out of the opening in said perimeter wall, said illumination assembly including a light being positioned in said recess such that said light does not extend through said opening.

6. A cell phone with an illumination assembly as described in claim 5, additionally comprising a switch mounted upon the perimeter wall of the housing of said cell phone.

7. A cell phone with an illumination assembly as described in claim 5, additionally comprising a sliding door member mounted on said housing and being selectively slidable over the opening of said recess.

8. An illumination system as described in claim 1, wherein the switching means is mounted on said light support portion.

9. A cell phone with an illumination assembly as described in claim 5, wherein the recess in said perimeter wall is located at an end of said housing.

10. An illumination system for removably mounting on a cell phone having a battery jack with a conductive cavity extending into the cell phone, said system comprising:
    an illumination assembly for removably mounting on the battery jack of the cell phone, said illumination assembly comprising:
        a plug portion removably mountable in the conductive cavity of the cell phone, said plug portion having conductive surfaces for electrically communicating with the conductive cavity of the battery jack, said plug portion having an insertion end for inserting into the conductive cavity and a base end opposite said insertion end;
        a light support portion mounted on the base end of said plug portion;
        a light portion mounted on the light support portion; and
        a switching means for selectively switching on and off supply of electrical power from said plug portion to said light portion, said switching means including a switch member mounted to said bulb support member and connected to said bulb member, wherein the switching means is mounted on said light support portion;
    wherein said bulb support member is pivotally attached to said plug member, said bulb support member pivoting about a central longitudinal axis of said plug portion, and wherein said light portion has a domed case with a substantially transparent lens mounted thereon for passing light therethrough, said lens being located at a distance from said central longitudinal axis such that light passing through said lens is directable in different directions.

11. The illumination system of claim 10 in combination with a cell phone having a battery jack with a conductive cavity extending into a housing of the cell phone.

* * * * *